March 2, 1926.
F. M. KENNEDY
AXLE
Filed Sept. 1, 1925
1,575,064
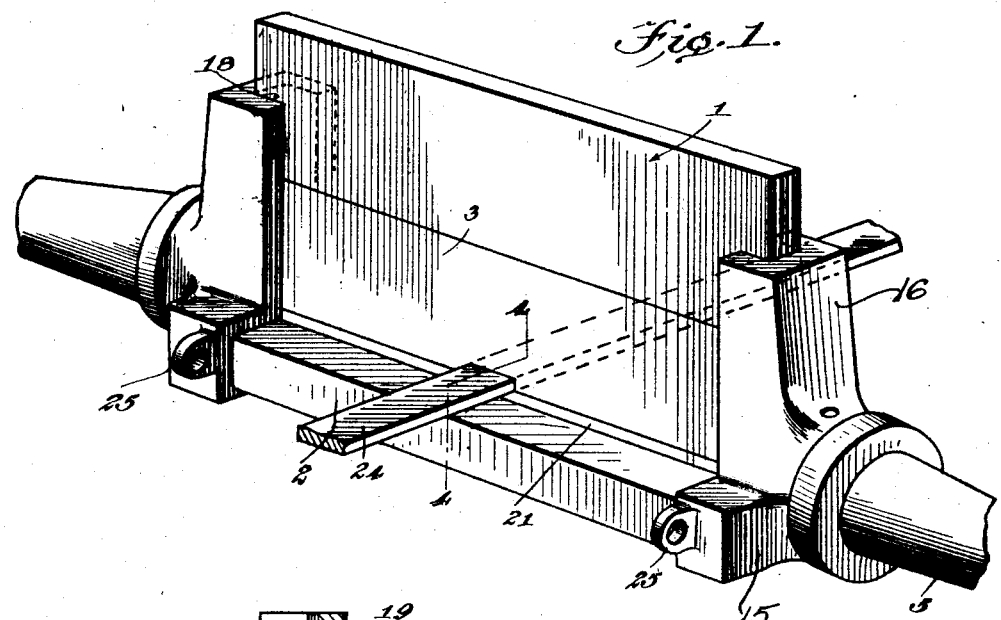
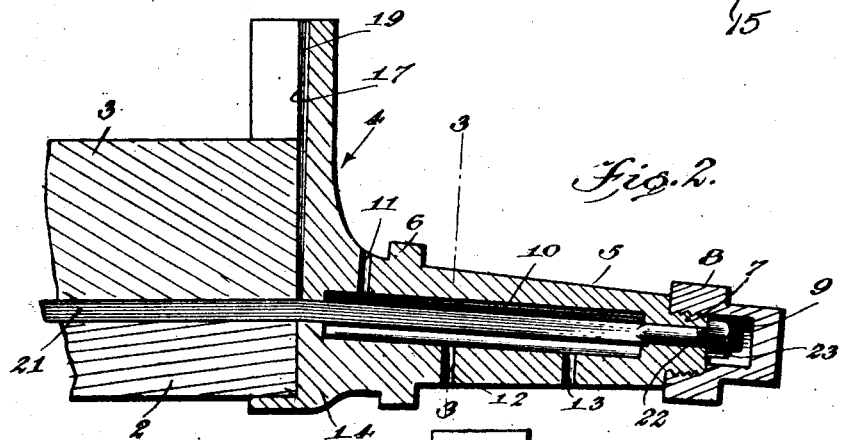
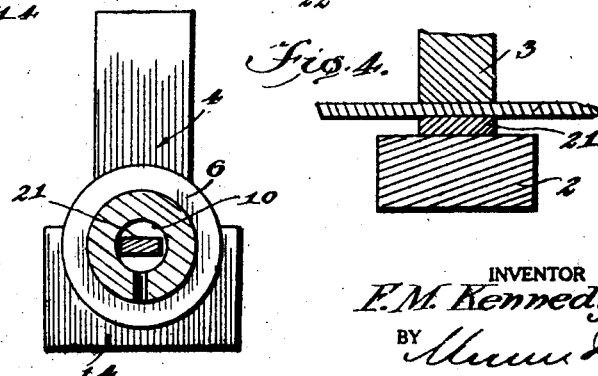
WITNESSES
INVENTOR
F. M. Kennedy,
BY
ATTORNEYS Patented Mar. 2, 1926.

1,575,064

UNITED STATES PATENT OFFICE.

FRANK MARION KENNEDY, OF CLARENDON, ARKANSAS.

AXLE.

Application filed September 1, 1925. Serial No. 53,933.

*To all whom it may concern:*

Be it known that I, FRANK MARION KENNEDY, a citizen of the United States, and a resident of Clarendon, in the county of Monroe and State of Arkansas, have invented certain new and useful Improvements in Axles, of which the following is a specification.

This invention relates to vehicle axles and more particularly to axles designed for use on wagons, trailers, or the like, which has for one of its objects the provision of an axle having wheel bearings in its ends so constructed as to obviate the need of reducing the cross section of the axle at the points of attachment of the wheel bearings.

Another object of the invention is the construction of a novel axle in which the wheel bearings are tied to the axle beam by means extending the full length of the axle.

Still another object of the invention is to construct a plural beam axle having wheel bearings formed with retaining sockets for the beams, the construction of the sockets being such that one or more of the beams may be raised in a depth direction, or a deeper beam substituted therefor to suit the load requirements.

A further object of the invention is to provide the wheel bearings with self contained lubrication means.

This invention will be best understood from a consideration of the following detailed description, in view of the accompanying drawing forming a part of the specification; nevertheless the invention is not confined to the disclosure, being susceptible of such changes and modifications which shall define no material departure from the salient features of the invention as expressed in the appended claims.

In the drawings:—

Figure 1 is a perspective view of an axle embracing the features of my invention, Figure 2 is a longitudinal section through one end of the axle, Figure 3 is a section taken along the line 3—3 of Figure 2, and Figure 4 is a section taken along the line 4—4 of Figure 1.

Referring now in detail to the several figures, the numeral 1 represents in general the axle beam, which preferably consists of a plurality of rectangular members or beams 2 and 3, the former being laid flat, the better to resist lateral strains upon the axle, and the latter placed on edge to increase its dimension in a depth direction with the object of obtaining maximum load supporting capacity. While but two beams are here shown, it is obvious that each beam might be made up of a plurality of smaller members, and the cost of making the axle thereby cheapened without materially lessening its strength.

The wheel bearings each consists of a metallic member 4 having the usual frusto conical surface 5 for receiving the wheel, the rear thrust collar 6 and the reduced threaded end 7 for the reception of the wheel retaining nut 8, the last named element being formed with a recess 9.

The bearing member 4 is provided with a chamber 10 in that part which underlies the wheel engaging surface 5 adapted to receive lubricant, supplied through a passage 11 opening to the outside of the bearing member, preferably from the upper side thereof and beyond the collar 6. The lubricant is fed to the bearing surfaces through passages 12 and 13.

The base 14 of each bearing member, that is to say, that part which lies rearwardly of the collar 6 is formed with a recess or socket to receive the ends of the axle beams 2 and 3. Since these are rectangular in cross section, one being laid flat and the other on edge, as previously described, the sockets will have the shape of an inverted T, the ends of the beam 2 being received in the horizontal limbs 15 of the sockets and the ends of the beam 3 being fitted in the vertical limbs 16. The walls of the vertical limbs are preferably extended upwardly a considerable distance in excess of the height of the beam 3 so as to elongate the sockets in a vertical direction to permit the beam 3 to be raised, if desired, and suitably supported in elevated position, or to permit the substitution of a deeper beam, should load conditions so require. It may be desirable at times to make the vertical limbs 16 of the sockets sufficiently long to embrace the ends of the bolster beams on the under side of the wagon body, and such construction is to be considered within the scope of this invention.

While the ends of the beams 2 and 3 preferably terminate in planes perpendicular to their length, the bottom walls 17 and 18 of the sockets, against which they abut are slidably inclined downwardly toward said beams causing a slight depression of the bearing members, below the horizontal, giving the vehicle wheels an inclination which compensates for deflection in the axle caused by the load. Wedge shaped shims 19 are preferably inserted or insertable between the ends of the beams and the bottom walls of the sockets, which may be adjusted from time to time to bring the wheels into proper alignment.

The bearing members 4 are secured to the axle beams by a tie rod 21, the intermediate portion of which lies between the beams 2 and 3 and materially increase the effective depth of said beams, augmenting their load supporting capacity. The tie rod is preferably flat except at the ends and passes through rectangular apertures leading from the bottom socket walls into the lubrication chambers, and through round apertures 22 extending to the outer ends of the bearing members. Nuts 23, which are housed in the recesses 9 within the wheel retaining nuts 8, are employed to place the tie rod in tensioned relation to the axle beams and bearing members, and they may be tightened from time to time to take up any play developing in the axle. When the tie rod is tensioned it will partake of the slight deflection incident to the normal slight depression of the bearing members relative to the axle beams. It is to be understood, that if desired, the lubrication chamber could be omitted without impairing the broader scope of the invention. Were this lubrication feature dispensed with, the tie rod would be made to pass through a bore of suitable dimensions, fitting said tie rod and passing from one end to the other of the bearing members.

It will be noted in the drawings that the tie rod may be made to serve the purpose of a wear piece for the reach pole 24, the latter passing through an opening in the lower side of the beam 3, and resting upon the tie rod.

The bases of the bearing members are shown provided with apertured lugs 25 for the reception of an additional tie rod, if necessary, or for connection to any suitable part of the vehicle gear.

Although I have, in the foregoing description of an illustrative form of my invention, disclosed what I believe to be an eminently practical embodiment of the same, it is to be understood that the practice of the invention is not confined to the specific details shown and described except where so limited by the express terms of the claims.

What I claim is:—

1. In a vehicle axle, a plurality of beams, bearing members having sockets receiving the ends of said beams, a tie rod lying between said beams and passing through said bearing members, said tie rod being tensioned against said bearing members for securing them together, the beam above said tie rod being cutaway on its lower side forming an opening bounded on the lower side by said tie rod, the latter functioning as a wear plate for a reach pole which may extend through said opening.

2. In a vehicle axle, a plurality of beams, of rectangular cross section arranged with their longer cross sectional dimensions in perpendicular relation, bearing members having sockets shaped to fit the ends of said beams, receiving the same, and a tie rod having a flat intermediate portion lying between said beams, and alined with the axes of said bearings, said tie rod being tensioned against said bearing members for securing them to said beams.

3. In a vehicle axle, upper and lower beams, the latter being placed flat and the former on edge, bearing members, having sockets shaped to receive the ends of said beams, and receiving said beams, the limbs of the sockets receiving the edgewise beam being longer than the depth of said beam.

4. In a vehicle axle, a plurality of horizontal beams, one laid flat and the other edgewise in superposed relation to said flat beam, bearing members having sockets receiving the ends of said beams, the portions of the sockets which receive the edgewise beam being longer than the depth of said beam, means between the ends of said beams and the walls of said sockets for adjusting the angularity of the axes of said bearing members with respect to said beams, said bearing members being axially apertured and a tie rod having a flat intermediate portion lying between said beams, said tie rod passing though the axle apertures in said beam members and means for tensioning said tie rod against said bearing members for securing them to said beams.

FRANK MARION KENNEDY.